March 2, 1971     D. F. WILKES     3,567,295
LINEAR RECIRCULATING ROLLER BEARING
Filed Sept. 24, 1968     3 Sheets-Sheet 1
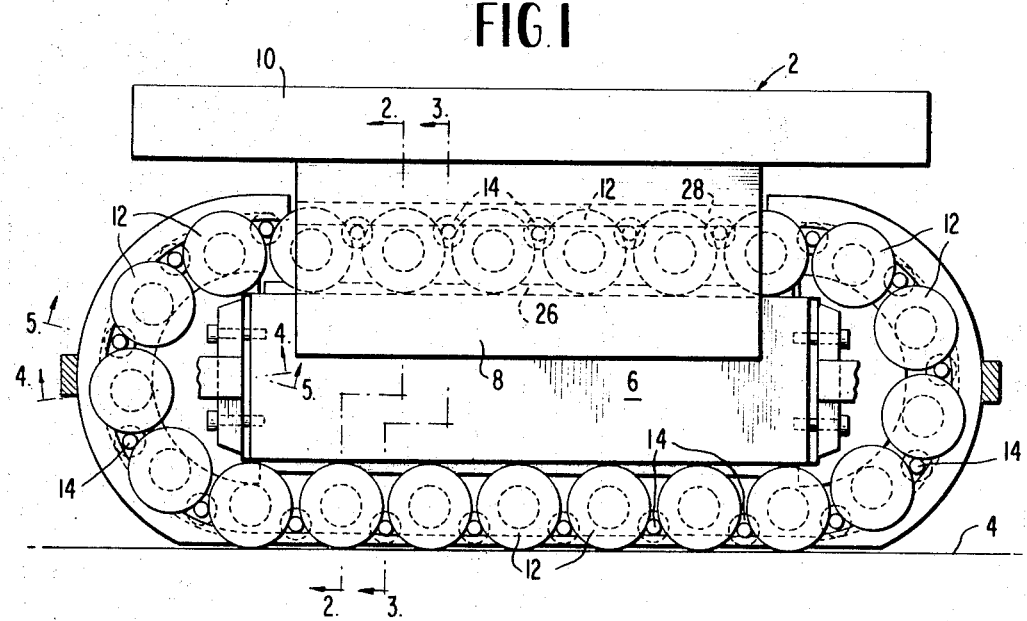
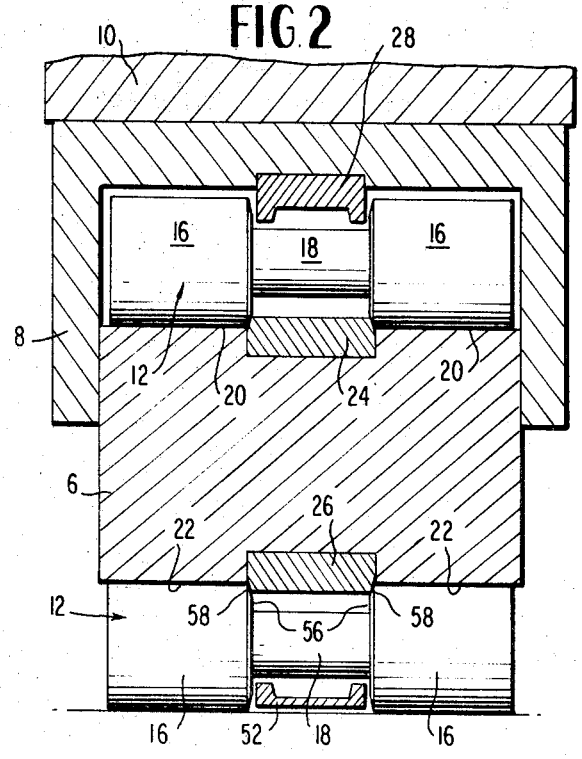
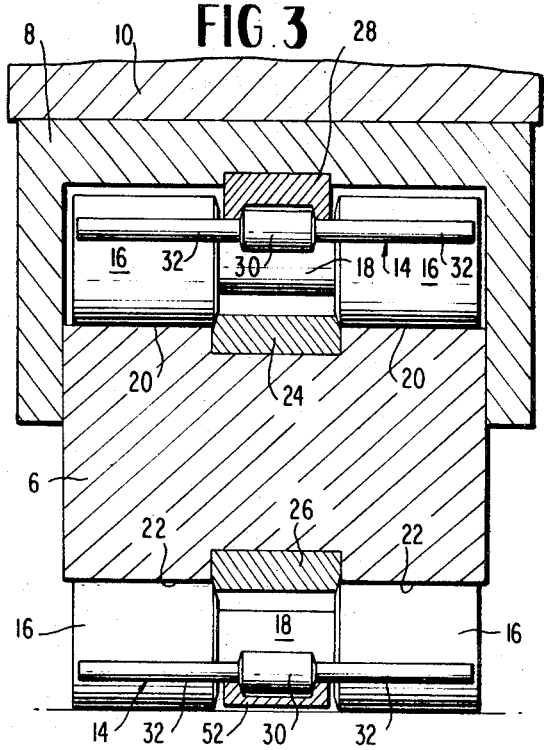
INVENTOR
DONALD F. WILKES
BY *Burns, Doane, Benedict, Swecker & Mathis*
ATTORNEYS

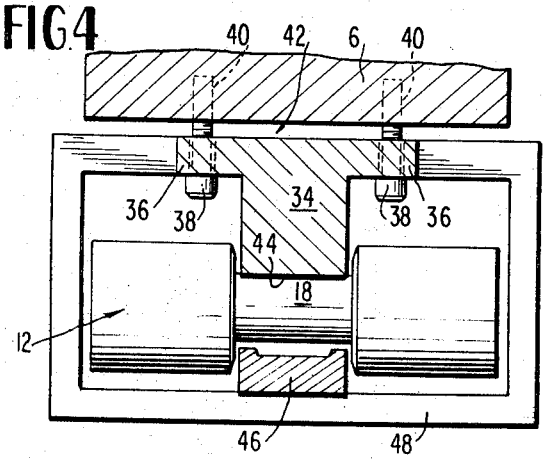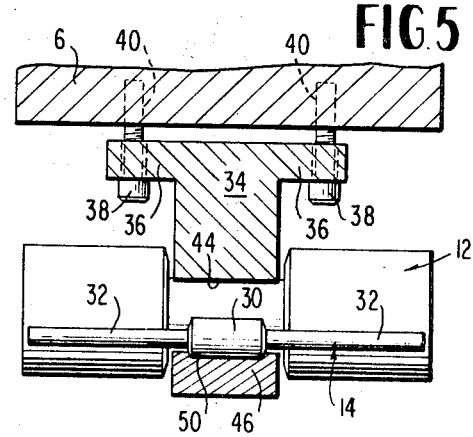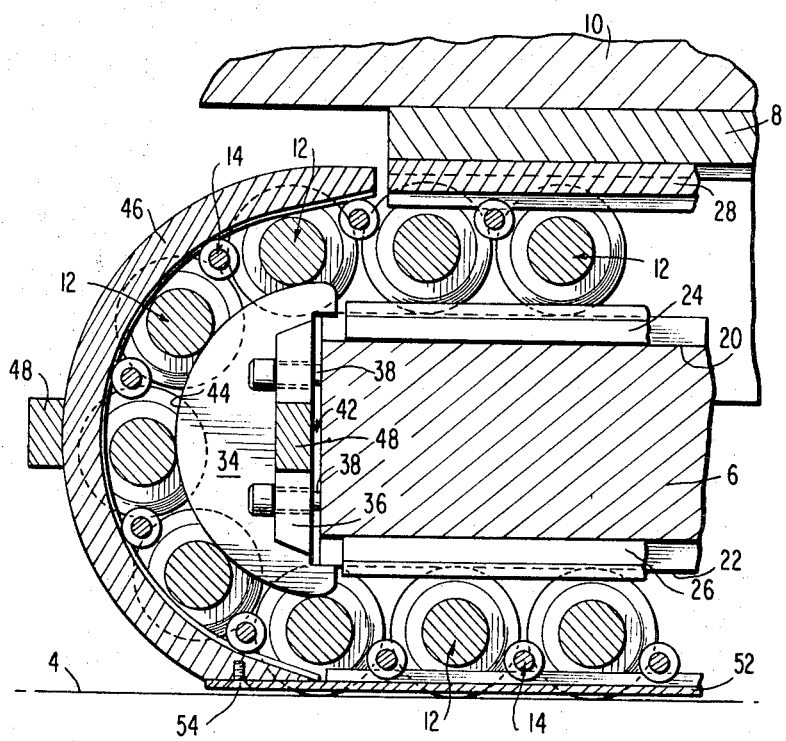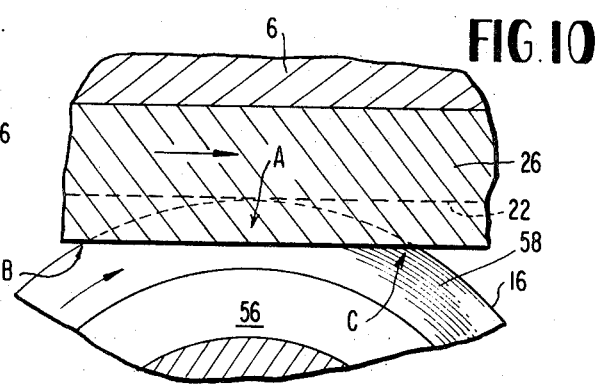

United States Patent Office 3,567,295
Patented Mar. 2, 1971

3,567,295
LINEAR RECIRCULATING ROLLER BEARING
Donald F. Wilkes, Albuquerque, N. Mex., assignor to Rolamite Technology, Incorporated, San Francisco, Calif.
Filed Sept. 24, 1968, Ser. No. 762,013
Int. Cl. F16c 29/06
U.S. Cl. 308—6
21 Claims

ABSTRACT OF THE DISCLOSURE

A bearing for supporting a load for relative movement along a substantially flat surface. The load is supported by means of a plurality of load bearing rollers which are mounted between bearing races having a pair of straight sections and arcuate sections interconnecting the ends of the straight sections to provide a closed loop. Spacer rollers are mounted in the races between the bearing rollers. Each roller has a pair of circular bearing surfaces of different diameters. The bearing races have corresponding bearing surfaces which engage the respective roller surfaces to cause a substantially constant rate of progression of the rollers along the straight sections and through the arcuate sections, so that the rollers do not slide relative to the bearing surfaces or relative to each other. The path of the central axis of the spacer rollers is at a greater distance from the center of curvature of each arcuate section than the load rollers. The circular roller surfaces and the bearing surfaces of each arcuate section cause the velocity of the central axis of the load rollers to be less than along the straight sections, while the veloctiy of the central axis of the spacer rollers is greater than along the straight sections. This is accomplished without changing the speed of rotation of the respective rollers. The bearing also includes an adjustment for varying the effective length of the bearing races in order to impose an initial load between the rollers and the bearing surfaces and thereby to prevent sliding around the entire loop. The rollers are maintained in alignment as they progress around the bearing races by opposed guide surfaces that engage conical surfaces on the rollers adjacent the circular bearing surfaces.

BACKGROUND OF THE DISCLOSURE

This invention relates to bearings and more particularly to bearings for supporting a load between relatively movable planar surfaces.

Various attempts have been made to reduce friction between relatively movable planar surfaces, such as between the table or saddle and the guides or ways of a machine tool. Attempts have been made to produce roller bearings having a straight bearing section opposite the support surface and a series of rollers positioned between the two flat bearing surfaces. When these are opposed flat surfaces separated by a plurality of equal sized rollers, and one surface is displaced longitudinally relative to the other, the rollers will roll along the surfaces provided that the inter-roller frictional resistance is not too great. To overcome this frictional resistance, spacer rollers of a smaller diameter may be provided between the load bearing rollers, with the central axis of the spacer rollers travelling along the same path as the load rollers. Since the spacer rollers do not engage either flat surface, they turn freely and inter-roller frictional resistance is substantially reduced.

The extent of longitudinal movement of the one flat surface relative to the other is limited by the finite length of the series of rollers. When the load is shifted by movement of the flat surface to a point beyond the end of the series of rollers, the bearing becomes unstable and may jam or fail. Thus, this type of linear bearing is limited by the effective length of the series of rollers. Also, a roller support must be provided for maintaining the load rollers and spacer rollers in their proper relative positions.

Various bearing arrangements have been proposed for providing an endless loop for recirculating the rollers so that there is no limit on the extent of movement of one surface relative to the other. These recirculating bearings have a curved section at each end which connects the ends of a pair of straight sections. One of the straight sections transmits the load through the rollers to the load bearing surface. One serious deficiency of these bearings is that they suffer from inherent frictional drag as the rollers move from one end of one straight section through the curved section to the beginning of the other straight section. When a load is being supported by the rollers in a straight section, relative movement causes the rollers to push the rollers in front of them through the curved section and progressively around the loop. Since the diameter of the path for the rollers is the same in the curved section as in the straight section, rolling along both of the curved races cannot occur. Therefore, it is necessary to slide the rollers along the curved section. Relative sliding movement along the arcuate path introduces excessive wear on the rollers, and in order to displace the bearing along the support surface, it is necessary to overcome this frictional drag. Furthermore, the rollers may wear unevenly and require frequent replacement.

It is desirable to resist the tendency of the rollers in the load bearing straight section to spread apart when the load is imposed upon them. This requires that all of the rollers have the same diameter, so that the bearing surfaces remain parallel, and that there be no gaps between rollers. This latter condition can be overcome by careful selection and assembly of the bearing, but it is expensive because the rollers and the races must be made to close tolerances.

Accordingly, it is an object of this invention to provide a linear recirculating bearing having a minimum of internal frictional drag.

It is another object of this invention to provide a linear recirculating bearing in which small variations in size and shape of the rolling elements can be tolerated without impairing operation of the bearing.

A further object of this invention is to provide a linear recirculating bearing in which the force between cooperating bearing surfaces may be imposed independently of the normal load on the bearing.

A still further object of this invention is to provide a bearing that may be operated in a variety of positions and under conditions of eccentric loading.

SUMMARY OF THE INVENTION

These objects are accomplished in accordance with a preferred embodiment of the invention by a bearing assembly having a central bearing body, with upper and lower flat bearing surfaces and arcuate bearing surfaces are provided at opposite ends of the bearing body. A housing is mounted on the bearing body and includes internal bearing surfaces opposite the flat and arcuate bearing surfaces to define therebetween a closed loop having upper and lower straight sections above and below the bearing body and arcuate sections at opposite ends interconnecting the straight sections.

Two sets of bearing rollers are mounted in alternating relation between these inner and outer bearing races. Each set of bearing rollers has a large diameter bearing surface and a small diameter bearing surface. The large diameter of the first set of rollers engages the inner bearing surface of the straight sections. The small diameter of the second set of rollers engages the outside bearing surface of the straight sections and also engages the large diameter bearing portion of the first set of rollers to act as spacer rollers. As the rollers pass through the arcuate sections, the small diameter surface of the first set of rollers engages the inner arcuate bearing surface while the large diameter surface of the second set of rollers engages the outer arcuate bearing surface. The central axes of the second set of rollers follow a path around the loop that is uniformly spaced outwardly from the path of the first set of rollers.

The size relation between the rollers and the inner and outer bearing races is selected to provide the same rate of progression of the rollers through the arcuate sections as along the straight sections, thereby substantially eliminating sliding friction between the rollers and the bearing surfaces. This is accomplished by slowing the velocity of the central axis of the first set while increasing the velocity of the central axes of the second set of rollers along their respective paths through the arcuate sections. At the same time, the rate of rotation of the rollers remains the same.

The rollers and bearing surfaces respectively are provided with cooperating flanges which prevent misalignment and lateral displacement of the rollers as they progress around the bearing races. This further reduces relative sliding between these elements. The distance between the arcuate sections at opposite ends of the bearing body is adjustable to eliminate gaps between the rollers and to apply a load between adjoining bearing surfaces. A preload ensures that pure rolling motion will occur independently of the external load on the bearing. Also, dimensional variations in the rollers and bearing surfaces can be compensated by preloading.

DESCRIPTION OF THE DRAWINGS

This preferred embodiment is illustrated in the accompanying drawings in which:

FIG. 1 is a side elevational view of the bearing assembly in accordance with this invention;

FIG. 2 is an enlarged cross sectional view of the bearing assembly along the line 2—2 in FIG. 1;

FIG. 3 is an enlarged cross sectional view of the bearing assembly along the line 3—3 in FIG. 1;

FIG. 4 is an enlarged cross sectional view of the end portion of the bearing assembly along the line 4—4 in FIG. 1;

FIG. 5 is an enlarged cross sectional view of the end portion of the bearing assembly along the line 5—5 in FIG. 1;

FIG. 6 is an enlarged longitudinal cross sectional view of one end of the bearing assembly;

FIG. 9 is a detail cross sectional view of a roller and a portion of the guide channel;

FIG. 10 is a cross sectional view of the roller and guide along the line 10—10 in FIG. 9;

DETAILED DESCRIPTION OF THE PREFERRED EMBODIMENT

Figure 7:
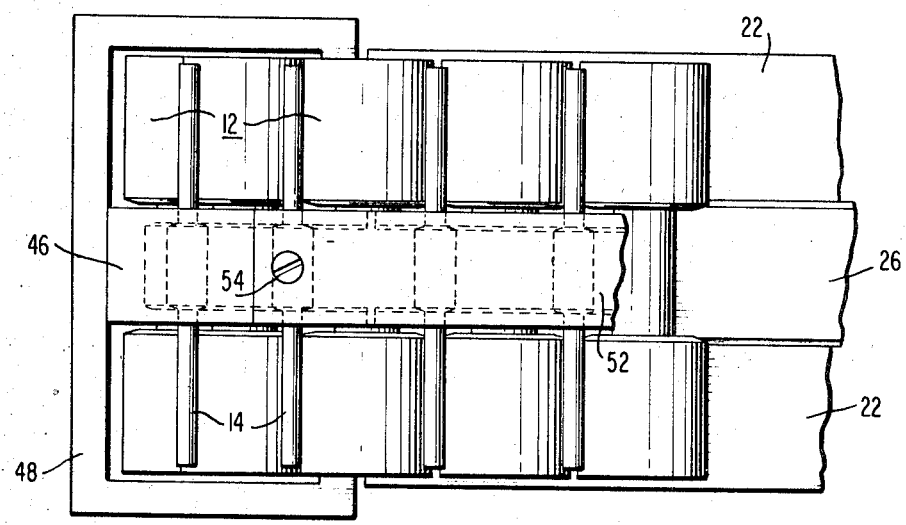
FIG. 7 is a bottom plan view of the end portion of the bearing assembly.

Referring to FIG. 1, the bearing assembly 2 of this invention is shown as supported on a flat horizontal surface indicated schematically at 4. The bearing assembly 2 includes a central body 6 and a channel member 8 which is rigidly secured to the body 6 for transmitting a load to the body 6 from a support plate 10 that is mounted on the member 8. A plurality of large rollers 12 and small rollers 14 are mounted for rolling movement in a closed loop around the body 6, between inner and outer bearing races.

As shown in FIG. 2, the large rollers 12 are generally spool-shaped with large diameter portions 16 at opposite ends and a small diameter intermediate portion 18. The body 6 has a substantially flat bearing surface 20 on the upper side of the body and a substantially flat bearing surface 22 on the lower side of the body which support the large rollers 12 for movement longitudinally of the body 6. In order to maintain the rollers 12 in alignment while moving along the bearing surfaces 20 and 22, tracks 24 and 26 are provided. The tracks 24 and 26 have substantially the same width as the distance separating the large diameter portions 16 of each roller 12. The lateral edges of the tracks 24 and 26 are bevelled uniformly throughout the length of the tracks and the radial faces of the large diameter portions 16 are tapered at approximately the same angle as the bevelled edges of the tracks, so that any tendency for axial misalignment results in a restoring moment on the rollers, as will be explained in greater detail subsequently.

The small rollers 14 are positioned between the large rollers 12 and are supported along the member 8 by a guide bar 28. The small rollers 14 include a large diameter portion 30 and small diameter portions 32 projecting outwardly from the opposite ends of the large diameter portion. The guide bar 28 has flanges extending along its opposite edges in position for supporting the small diameter portions 32 for rolling movement lengthwise of the guide 28. As shown in FIGS. 1 and 3, the small diameter portions 32 directly engage the large diameter portions 16 of the large rollers 12 and are sufficiently large to maintain separation between adjacent large rollers 12.

At opposite ends of the body 6, the inner and outer races are curved through an arc of approximately 180°. The arcuate inner race is provided by a guide member 34 as shown in FIGS. 1, 4, 5 and 6. The guide members 34 each has lateral flanges 36 and cap screws 38, which extend through holes in the flanges 36, are threadedly received in sockets 40 in the body 6. A gap indicated at 42 is normally provided between the inner end of the guide member 34 and the end of the body 6. By turning the cap screws 38, the spacing between the body 6 and the member 34 can be adjusted. As shown in FIGS. 4 and 6, the small diameter portion 18 of the large roller 12 is supported by the member 34 and bears against an arcuate surface 44, which extends through an arc of approximately 180°.

The small rollers 14 are supported by an arcuate guide 46 which is rigidly mounted on the member 34 by a bracket 48 which extends outwardly from the flanges 36. The guide 46 is welded or otherwise rigidly secured to the bracket 48. Referring to FIG. 5, the large diameter portions 30 of the small rollers 14 roll along an arcuate support surface 50 which is concentric with the arcuate surface 44 and are maintained in alignment by inwardly projecting flanges which extend along opposite edges of the guide bar 46. The small diameter portions 32 bear against the large diameter portions 16 of the adjacent large rollers 12, as the rollers progress along the arcuate support surfaces 44 and 50.

The rollers 12 and 14 are supported along the bottom of the body 6 by a guide bar 52, as shown in FIGS. 3 and 7. Each end of the bar 52 is rigidly secured to the arcuate guide 46 by a screw 54, or other suitable means. The guide bar 52 preferably has sufficient rigidity to resist bending to such an extent that the lower surface of the guide bar 52 would engage the surface 4. The small rollers 14 are supported on the bar 52 with the small diameter portions 32 engaging upwardly projecting flanges along opposite edges of the bar 52.

The proportions of the roller diameters and the dimensions of the guide surfaces are selected to provide substantially pure rolling motion along the straight sections of the bearing races and around the arcuate sections at opposite ends of the bearing body. The rollers 12 and 14 progress along the arcuate sections at a rate that is equivalent to the rate of progression along the straight sections of the bearing assembly. Also, the speed of rotation of the respective rollers is the same in both the arcuate sections and the straight sections.

Figure 8:
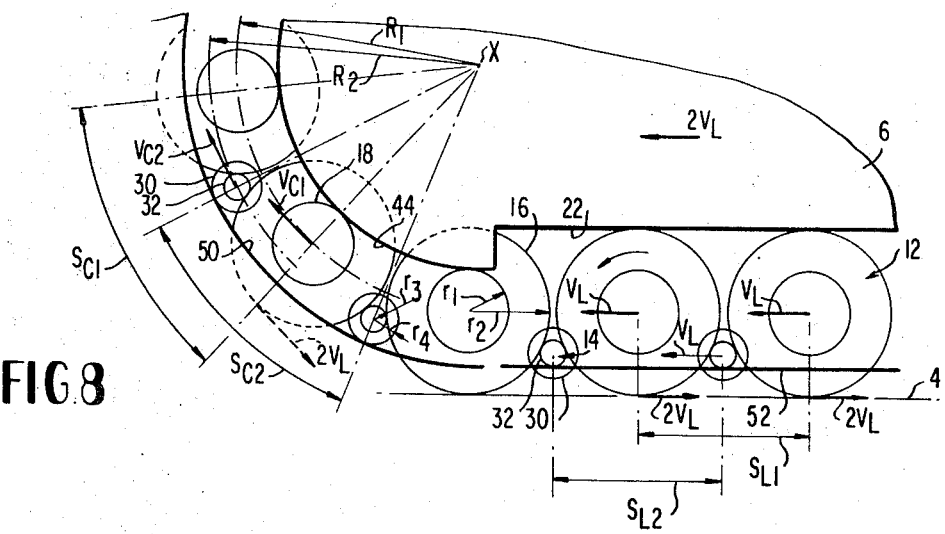
FIG. 8 is a schematic view of a portion of the bearing assembly.

In FIG. 8, a portion of a straight section and a portion of an arcuate section is shown schematically. The support surface 4 is stationary and the body 6 is moving toward the left at a rate $2V_L$ where $V_L$ is equal to the velocity of the central axis of the load bearing rollers 12 and the spacer rollers 14 relative to the surface 4. Since sliding does not occur, the tangential velocity of the rollers 12 at the surfaces 16 is $2V_L$. Adjacent rollers 12 are spaced apart along the surface 22 a distance $S_{L1}$ which is equal to the separation $S_{L2}$ between the small rollers 14. For a given unit of time, the quantity Q of the rollers 12 and 14 passing a fixed point on the surface 22 is:

$$Q = \frac{V_L}{S_{L1}} = \frac{V_L}{S_{L2}}$$

To avoid sliding between the rollers, the same quantity Q of rollers 12 and 14 must pass through a fixed plane defined by the center of curvature X of the arcuate section and by a straight line that is parallel to the central axes of the rollers 12 and 14. The velocities of the central axes of the rollers 12 and 14, $V_{C1}$ and $V_{C2}$, respectively, are proportional to the distance $S_{C1}$ and $S_{C2}$ along the curved path separating the central axes of adjacent rollers of the same size.

$$Q = \frac{V_{C1}}{S_{C1}} = \frac{V_{C2}}{S_{C2}}$$

$$\text{and } \frac{V_{C1}}{V_{C2}} = \frac{S_{C1}}{S_{C2}}$$

In moving from the straight section to the curved section, the speed of rotation of the rollers 12 and 14 remains the same and no sliding occurs, and accordingly, the velocities $V_{C1}$ and $V_{C2}$ change:

$$\frac{2V_L}{V_{C1}} = \frac{r_1 + r_2}{r_1}$$

$$V_{C1} = 2V_L\left(\frac{r_1}{r_1 + r_2}\right)$$

$$\text{and } \frac{2V_L}{V_{C2}} = \frac{r_3 + r_4}{r_4}$$

$$V_{C2} = 2V_L\left(\frac{r_4}{r_3 + r_4}\right)$$

$r_1$ = radius of small diameter portion 18 of large roller 12.
$r_2$ = radius of large diameter portion 16 of large roller 12.
$r_3$ = radius of small diameter portion 32 of small roller 14.
$r_4$ = radius of large diameter portion 30 of small roller 14.

Since the velocity of the central axes of the rollers along the arcuate section does not include any component of roller rotation about the central axis, these velocities must be directly proportional to the radii of the paths followed by the respective roller central axes. Hence:

$$\frac{V_{C1}}{V_{C2}} = \frac{R_1}{R_2}$$

where $R_1$ is the radius of curvature of the path of the center line of the large rollers 12 and $R_2$ is the radius of curvature of the path of the center line of the small rollers 14.

The proportionality of $V_{C1}$ and $V_{C2}$ to $S_{C1}$ and $S_{C2}$ was noted above:

$$\frac{V_{C1}}{V_{C2}} = \frac{S_{C1}}{S_{C2}} = \frac{R_1}{R_2}$$

This shows that the ratio of the velocities of the central axis of the large and small rollers along the arcuate section is the same as the ratio of the distance $S_{C1}$ between adjacent large rollers to the distance $S_{C2}$ between adjacent small rollers, and is also equal to the ratio of radii of the curved paths to the central axes of the large and small rollers, $R_1$ and $R_2$, respectively. This is summarized as follows:

$$\frac{V_{C1}}{V_{C2}} = \frac{S_{C1}}{S_{C2}} = \left(\frac{r_1}{r_1 + r_2}\right)\left(\frac{r_3 + r_4}{r_4}\right) = \frac{R_1}{R_2}$$

The above equation fully defines the required relationships between the large and small rollers and the guide surfaces along the arcuate sections of the bearing. The radius of curvature of the guide surface 44 can be determined by deducting the large roller radius $r_1$ from the radius $R_1$ of the path of the large roller 12 central axis. Similarly, the radius of curvature of the outer guide surface 50 can be determined by adding the small roller radius $r_4$ to the radius $R_2$ of the path of the small roller 14 central axis.

Of course, the difference between the outer and inner radii of the paths of the respective roller central axes along the arcuate section should be the same as the height $h$ between the paths of the large and small rollers along the straight section. Also, the sum of the radii of the large diameter portion 16 of the large roller and the small diameter portion 32 of the small roller must be greater than the height $h$ and the height $h$ must be greater than zero. The sum of the radii of the small diameter portion 18 of the large roller and the large diameter portion 30 of the small roller also must be greater than the height $h$. This means that the distance separating the central axes of the large and small rollers exceeds the vertical separation of the axes so that the rollers are locked in position between the inner and outer guide surfaces.

In order to maintain alignment of the rollers 12 and 14 as they progress around the arcuate sections and straight sections of the bearing assembly, the various guide surfaces engage opposite radial faces of the rollers to resist misalignment. This guidance feature is illustrated in FIGS. 9 and 10. The inner radial face 56 of each large diameter portion 16 has a frusto-conical portion 58 which intersects the outer circumference of the large diameter portion 16.

The cone angle (FIG. 9) is preferably between one-half degree and three degrees, but may be slightly larger depending upon the conditions of operation of the bearing assembly. The guide bar 26 also has a bevelled or sloping side wall 60 which is inclined from the vertical at an angle which is approximately equal to the cone angle $\alpha$.

Referring to FIG. 2, it is desirable for the central axis of the roller 12 to remain perpendicular to the longitudinal axis of the guide bar 26, as the roller moves along from one end to the other of the straight section. Assuming that the rollers 12 are rotating clockwise along the lower support surface 22, as viewed in FIG. 6, then the relative movement of the portions of the roller and guide bar are indicated by the respective arrows in FIG. 10 as the entire bearing assembly progresses along the surface 4. The conical surface 58 normally engages the sloping side 60 in line contact at the region marked A in FIG. 10. The spacing between the conical portion 58 of the large roller 16 and the sloping side 60 increases progressively on opposite sides of the region marked A, with the maximum separation occurring at the point where the periphery of the large diameter portion 16 is intersected by the plane of the lower horizontal surface of the guide bar 26, which is indicated at B and C in FIG. 10.

If the central axis of the large roller 12 should tend to swing in a horizontal plane, so that it is no longer perpendicular to the longitudinal axis of the guide bar 26, the region of contact between the conical surface 58 and the sloping surface 60 on one side of the bar 26 is displaced progressively from the region marked A toward the region marked B behind the central axis of the roller. On the opposite side of the guide bar 26, the zone of contact between the conical surface 58 and the sloping side 60 is displaced progressively forward of the central axis of the roller 12 toward the region marked C. Thus, a torque is applied by the sloping sides 60 along opposite edges of the bar 26 to urge the roller 12 back toward an aligned position wherein the region of contact occurs at the point marked A.

Since the conical surfaces 58 on the rollers engage the sloping surfaces 60 on the guide bar 26 in rolling contact when the roller axes are in alignment, and since there is a gap normally provided at the points B and C, any foreign matter, such as dust or dirt particles which should enter the space between the cooperating surfaces 58 and 60, does not seriously interfere with the guiding action of these surfaces. Also, because of the rolling contact between the surfaces 58 and 60, there is very little tendency for wear. A small amount of sliding occurs between the surfaces when the rollers are misaligned, but the amount of sliding is so slight, that the wear resulting is negligible.

Although the guide surfaces 58 and 60 are on the large diameter portions 16 and the lower section of the bearing assemblies, substantially the same guide surfaces are provided on the upper straight section between the guide bar 24 and the large diameter portions 16. On the curved sections at opposite ends of the body 6, guidance is provided by conical surfaces on opposite ends of the enlarged portions 30 of the small roller 14 and inclined surfaces on the inside of the flanges which define the opposite sides of the groove 50, as shown in FIG. 5. These cooperating guide surfaces maintain the rollers in substantial axial alignment as they progress around the bearing races. If desired, additional guidance surfaces can be provided on the upper track 28 and on the guide bar 52 for maintaining the small rollers in alignment.

In order to obtain effective guidance of the rollers 12 and 14 by these cooperating guide surfaces, it is necessary for the rollers to be urged firmly against their respective bearing surfaces. By utilizing a full complement of rollers and by adjusting the members 34 relative to the body 6, sufficient force may be imposed between adjacent rollers and their respective bearing surfaces to achieve effective guidance, even when there is no external load on the bearing.

In operation, the surface 4 is stationary and the bearing assembly 2 is displaced longitudinally along the surface 4 toward the left, as viewed in FIG. 1. The large diameter rollers 12 engage the surface 4 and engage the lower bearing surface 22 of the body 6 to support a load between the body and the surface 4. Since the body 6 is connected with the support plate 10 by the channel member 8, the plate 10 moves along the surface 4 with the body 6. Frictional engagement between the lower bearing surface 22 and the large diameter rollers 12 causes the rollers to rotate counterclockwise as viewed in FIG. 1. The small diameter portions 32 of the small rollers 14 engage the flanges of the guide 52 and also engage the large diameter portions 16 of the large rollers 12. The central axis of the large rollers 12 progresses toward the left at one-half the rate of the body 6, and since the small rollers 14 have the same separation as the large rollers, the small rollers also progress toward the left at one-half the rate of the body 6. Sliding does not occur between adjacent rollers or between the rollers and the bearing surfaces.

When the large diameter rollers 12 enter the arcuate section at the left end of the body 6, the speed of rotation of the roller does not change, but the inner bearing surface 44 engages the small diameter portion 18. When the small rollers 14 enter the arcuate section, the outer bearing surface 50 engages the large diameter portion 30 of the small roller 14. The speed of rotation of the small roller in the arcuate sections remains the same as it was in the straight section. Also, the distance separating the paths of the central axes of the large and small rollers is substantially the same in the arcuate sections and in the straight sections. The spacing between the large rollers and between the small rollers as measured along their respective arcuate paths do change, so that the velocity of the central axis of the small rollers along the path increases while there is a proportional decrease in the velocity of the central axis of the large rollers. Thus, the rate of progression of each roller through a fixed plane extending outwardly from the center of curvature of the arcuate section in parallel relation to the central axes of the rollers is exactly the same as the rate of the progression of the rollers along the straight section of the bearing.

When the rollers reach the end of the left-hand arcuate section, the large diameter portion 16 of the large rollers engages the upper bearing surface 20 and the small diameter portions 32 of the small rollers engage the upper track 28. The vertical spacing between the bearing surfaces of the track 28 and the bearing surface 20 is the same as the vertical distance between the bearing surfaces on the flanges of the bar 52 and the lower bearing surface 22, so that the rate of progression of the rollers toward the right, as viewed in FIG. 1, along the upper portion of the body 6 is the same as that along the lower portion. The rollers 12 engage only the bearing surface 20 and the top edge of the rollers is spaced from the underside of the channel member 8, as shown in FIGS. 2 and 3. At the right hand end of the bearing body 6, the rollers again enter an arcuate section which is identical with the arcuate section at the left hand end of the body 6. The inner bearing surface engages the small diameter of the large roller 12 and the outer bearing surface engages the large diameter of the small rollers so that the rate of progression of the roller clusters through the arcuate section is equal to the rate of progression along the straight sections. The rollers then pass from the arcuate section into the lower straight section and the cycle is repeated.

The adjustable arcuate members 34 at the opposite ends of the body 6 permit the length of the bearing races to be shortened in order to impose a load between adjacent rollers and between the rollers and the bearing surfaces. This type of preloading does not depend upon the accuracy of the dimensions of the rollers, but rather permits preloading even though there may be a slight variation between the size and concentricity of the various rolling portions of the rollers. Furthermore, the screw type adjustment provides accurate control over the degree of preloading.

Due to the lateral guidance of the rollers which is provided by the guide bars 24 and 26, particularly, this bearing is capable of withstanding side loading to a degree which has not been possible with previous recirculating linear roller bearings. Since the guide bars 24 and 26 are separate from the body 6, they may be accurately machined by grinding to close tolerances and matched so that accurate guidance is provided along both straight sections of the bearing assembly.

Figure 11:
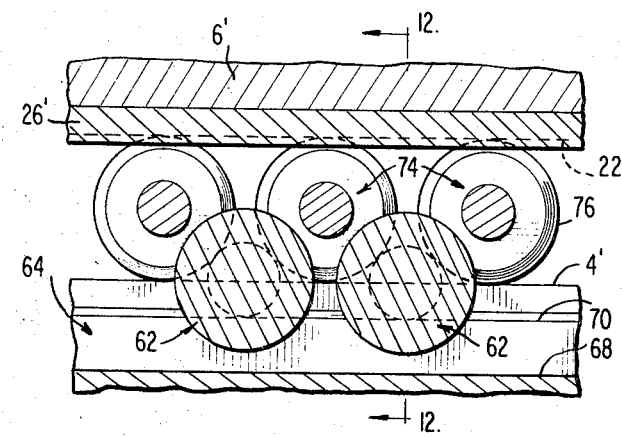
FIG. 11 is a detail cross sectional view of a modified bearing assembly.
Figure 12:
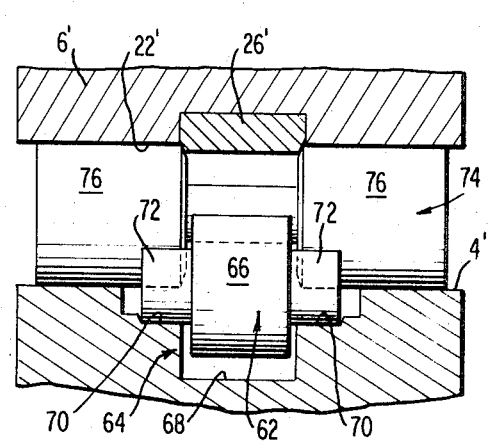
FIG. 12 is a cross sectional view of the modified assembly along the line 12—12 in FIG. 11.

The separator rollers 14 in this preferred embodiment are much smaller in diameter than those of the main rollers 12, but in a modified form of the invention as illustrated in FIGS. 11 and 12, the spacer rollers 62 are received in a recessed track 64 in the support surface 4' to allow clearance for the large diameter portion 66 of the spacer rollers. The arrangement of this modified assembly is the same as the assembly illustrated in FIG. 1, but the bar 52 (FIG. 6) is removed and the spacing and relative sizes of the bearing surfaces are changed to accommodate the larger rollers 62. The track 64 has a suitable length and the rollers 62 move progressively into and out of the track 64 as the assembly is displaced lengthwise of the track.

As shown in FIGS. 11 and 12, the track 64 includes a central groove 68 in which the large diameter portion of the spacer roller 62 is received. Ledges 70 extend along opposite sides of the groove 68 for supporting the small diameter portions 72 of the spacer rollers. Shoulders along the inner edges of the ledges 70 engage the opposite ends of the spacer rollers 62 to guide the rollers in the same manner as is shown in FIGS. 9 and 10. The load bearing rollers 74 have large diameter portions 76 which engage the bearing surfaces 22' and 4'.

At the opposite ends of the lower straight section of the modified asembly, the arcuate outer surface corresponding to the surface 50 in FIG. 6, projects into the groove 68, so that the large diameter portion 66 of the spacer roller is guided into the arcuate section from the track 64. The small diameter portion 78 of the large rollers 74 engages the inner arcuate surface corresponding to the surface 44 in FIG. 6. The operation of this modified assembly is the same as the assembly in FIG. 1, except that the guide for the spacer rollers is integral with the support surface 4' and the spacer rollers 62 move progressively into and out of the recessed track 64.

An important advantage of the bearing assembly of this invention is that the tight guidance provided by the preloaded rollers permits more effective scrubbing and cleansing of the rollers as they circulate, so as to reduce the tendency for contamination to build up on the rollers, or to embed itself into the primary load bearing surfaces in the bearing or on the surface 4 on which the bearing assembly is supported. This scrubbing action can be accomplished by providing skimmers which would wipe the rollers as they pass around the bearing. The tighter guidance makes it possible to do a more effective job inside the bearing itself to eliminate the contamination or wear particles which might arise inside the bearing.

The true rolling actions accomplished by this bearing and the ability to preload the bearing makes the dimensions of the components of the bearing less critical and therefore the bearing is economical to produce and to install in machine tools and other insulations where linear bearings would be advantageous. If the linear bearing is subjected to variations in loads, adjustment of the preload on the bearing rollers can be made to tighten or loosen the rolling action. Also, the reduction of sliding between the components of the bearing is so great that the bearing assembly has a significantly longer life and requires considerably less maintenance. Not only is a smaller force required to displace the rollers along the path than in conventional recirculating linear bearings, but a smoother starting and stopping action is obtained. This permits very small linear motions to be practical and there is less danger of irregular motion due to sliding or sticking of the rollers on the bearing surfaces. This is particularly important when the bearing is under light loads.

While this invention has been illustrated and described in several embodiments, it is recognized that variations and changes may be made therein without departing from the invention as set forth in the claims.

I claim:

1. A bearing comprising:
   means forming a continuous bearing race, said bearing race having a substantially straight section and an arcuate section adjacent said straight section,
   a plurality of bearing elements, means mounting said bearing elements for rolling motion through said straight section and said arcuate section, said elements including a first set of rollers and a second set of rollers alternating with said first rollers along the length of said bearing race, said first and second rollers each having large and small rolling surfaces spaced axially apart from each other, said large surface of said first rollers being in rolling engagement with said small surface of said second rollers,
   said straight section and said arcuate section each having inner and outer opposed bearing surfaces extending along the length of said bearing race, said large surface of said first rollers engaging said straight section inner bearing surface and said small surface of said second rollers engaging said straight section outer bearing surface, said small surface of said first rollers engaging said arcuate section inner bearing surface and said large surface of said second rollers engaging said arcuate section outer bearing surface,
   the central axis of said first rollers following a first path along said straight section and along said arcuate section, the central axis of said second rollers following a second path along said straight section and along said arcuate section, said first and second paths being uniformly spaced apart from each other along said straight section and said arcuate section, the sum of the radii of said first roller large surface and said second roller small surface being greater than the distance separating said first and second paths, whereby said rollers progress around said bearing race without sliding relative to said bearing surfaces or adjacent rollers and said large surface of said first rollers transmit a load from the bearing to a support along said straight section.

2. The bearing according to claim 1 including means for adjusting the length of said bearing race.

3. The bearing according to claim 1 wherein the large surface of said first rollers has a larger diameter than the large surface of said second rollers.

4. The bearing according to claim 1 wherein the diameters of the large and small surfaces of the first and second rollers relative to each other and relative to the radius of curvature of said inner and outer arcuate bearing surfaces cause the respective rollers to rotate at the same speed through both of said sections.

5. The bearing according to claim 1 wherein said bearing race includes a plurality of said straight sections and said arcuate sections.

6. The bearing according to claim 5 wherein a pair of straight sections are arranged in parallel relation spaced apart from each other, and a pair of arcuate sections interconnect the adjacent ends of said straight sections to form a closed loop.

7. The bearing according to claim 1 wherein said rollers each have an axis of rotation, said inner bearing surface being substantially parallel to said roller axes.

8. The bearing according to claim 1 wherein said small surface of said first rollers are radially aligned with said large surface of said second rollers.

9. The bearing according to claim 8 wherein said large rollers include a pair of large rolling surfaces on opposite sides of said small rolling surface, said small rollers include a pair of small rolling surfaces on opposite sides of said large rolling surface.

10. A bearing for linear movement along a reaction surface comprising:
    a bearing body having upper and lower straight bearing surfaces and arcuate bearing surfaces on opposite ends of said body, housing means, said housing means including bearing surfaces extending in opposed spaced relation with said upper and lower body surfaces and said arcuate bearing surfaces to form an outer bearing race,
    a first set of rollers, a second set of rollers alternating with said first rollers along the length of said bearing races, said first rollers each having a pair of large rolling surfaces spaced axially apart from each other and a small rolling surface extending between said large surfaces, said second rollers each having a pair of small rolling surfaces spaced axially apart from each other and a large rolling surface extending between said small surfaces, said large surfaces of said first rollers being in rolling engagement with said small surfaces of said second rollers, said large surface of said first rollers engaging said upper and lower body surfaces, said small surface of said second rollers engaging said outer bearing race opposite said straight body surface, said small surface of said first rollers engaging said arcuate bearing surfaces and said large surface of said second rollers engaging said outer bearing race opposite said arcuate bearing surfaces, the central axis of said first rollers following a first path along said straight bearing surface and along said arcuate bearing surface, the central axis of said second rollers following a second path along said straight bearing surface and said arcuate bearing surface, said first and second paths being uniformly spaced apart from each other along said straight bearing surface and said arcuate bearing surface, the sum of the radii of said first roller large surface and said second roller small surface being greater than the distance separating said first and second paths, thereby causing said rollers to progress around said bearing race without sliding relative to said bearing surfaces or adjacent rollers, said large surface of said first rollers being in position to engage a reaction surface extending in parallel spaced relation along said lower body surface, whereby a load applied to said body in the direction of said reaction surface is supported by said first rollers during movement of said body along said reaction surface.

11. The linear bearing according to claim 10 including means for urging the central axes of said first and second rollers toward a parallel position during displacement along said race.

12. The linear bearing according to claim 11 wherein said roller surfaces are substantially cylindrical and said first rollers have an opposed pair of radial faces at the inner ends of said large rolling surfaces, said urging means includes an elongated guide extending along said straight surface and projecting outwardly therefrom, said guide having opposite straight sides spaced apart substantially the same distance as said radial faces, said radial faces each having a conical portion extending inwardly from said cylindrical surface, said sides each being inclined from an axis perpendicular to said straight surface at substantially the same angle as the angle between said radial face and said conical portion, said sides being in position to be engaged by said conical portions to urge said rollers toward an axially aligned position.

13. The linear bearing according to claim 12 wherein said angle is less than 10 degrees.

14. The linear bearing according to claim 10, wherein one of said arcuate surfaces is provided on a segment secured on said bearing body, and includes means for adjusting the position of said segment relative to said bearing body, whereby the length of said bearing race can be adjusted.

15. The linear bearing according to claim 11, wherein said second roller large surface has a shorter axial length than said first roller small surface, said outer bearing race opposite said upper body surface including a pair of tracks projecting into the space between the adjacent ends of said first roller large surface and said second roller large surface.

16. The linear bearing according to claim 11, wherein said outer bearing race opposite said arcuate surfaces includes flanges projecting radially inward toward the center of curvature of said arcuate surface, said large surface of said second rollers having chamfers at opposite ends, said flanges having inclined faces in position for engagement with said chamfers, said flange faces having substantially the same slope as said chamfers.

17. The linear bearing according to claim 11, wherein said housing means includes a bar extending longitudinally of said lower bearing surface, said outer race being provided on an upper surface of said bar in engagement with said small surface of said second rollers, said bar having a lower surface spaced from said lower bearing surface a distance shorter than the diameter of said large surface of said first roller, whereby said bar supports said second rollers without interfering with engagement of said first rollers with said reaction surface.

18. A bearing for linear movement along a reaction surface comprising:

a bearing body having upper and lower straight bearing surfaces and arcuate bearing surfaces on opposite ends of said body, housing means, said housing means including bearing surfaces extending in opposed spaced relation with said upper and lower body surfaces and said arcuate bearing surfaces to form an outer bearing race, a first set of rollers, a second set of rollers alternating with said first rollers along the length of said bearing races, said first rollers each having a pair of large rolling surfaces spaced axially apart from each other and a small rolling surface extending between said large surfaces, said second rollers each having a pair of small rolling surfaces spaced axially apart from each other and a large rolling surface extending between said small surfaces, said large surfaces of said first rollers being in rolling engagement with said small surfaces of said second rollers, said large surface of said first rollers engaging said upper and lower body surface, said small surface of said second rollers engaging said outer bearing race opposite said straight body surface, said small surface of said first rollers engaging said arcuate bearing surfaces and said large surface of said second rollers engaging said outer bearing race opposite said arcuate bearing surfaces, the central axis of said first rollers following a first path along said straight bearing surface and along said arcuate bearing surface, the central axis of said second rollers following a second path along said straight bearing surface and said arcuate bearing surface, said first and second paths being uniformly spaced apart from each other along said straight bearing surface and said arcuate bearing surface, the sum of the radii of said first roller large surface and said second roller small surface being greater than the distance separating said first and second paths, thereby causing said rollers to progress around said bearing race without sliding relative to said bearing surfaces or adjacent rollers, a bearing support surface extending longitudinally of said straight surfaces, said large surface of said first rollers being in direct engagement with said support surface, said support surface including means forming said outer race.

19. The bearing according to claim 18 wherein said outer race means includes a groove extending longitudinally in said support surface, said groove having ledges extending along opposite sides thereof, said small surfaces of said second rollers engaging said ledges for rolling movement thereon.

20. A bearing assembly comprising a rolling element and a race having a bearing surface for engagement by said element, said element including a substantially cylindrical rolling surface and a pair of opposed radial faces adjacent said rolling surface, said race including a pair of shoulders extending along said bearing surface in the direction of rolling movement of said element, said shoulders being in opposed relation and uniformly spaced apart, each of said shoulders projecting outwardly from said bearing surface a distance substantially less than the radius of said cylindrical surface and in overlapping relation with one of said radial faces, said radial faces each having a conical portion coaxial with said cylindrical surface and extending inwardly from said cylindrical surface, said shoulders each being inclined from an axis perpendicular to said bearing surface at substantially the same angle as the angle between a radius of said cylindrical surface and said conical portion, said element being in direct engagement with said bearing surface and the axial spacing between said radial faces being fixed and being substantially equal to the spacing between said opposed shoulders, means pressing said rolling element against said bearing surface, said pressing means including a pressing element having a surface, said pressing element surface being in engagement with said cylindrical surface and said pressing element surface being movable concurrently in the same direction with said cylindrical surface while said element rolls along said bearing surface, whereby said rolling element is urged toward an aligned position during rolling movement along said bearing surface.

21. The bearing assembly according to claim 20 wherein said pressing element is a roller having a central axis spaced a greater distance from said bearing surface than the central axis of said cylindrical surface.

References Cited

UNITED STATES PATENTS

| | | | |
|---|---|---|---|
| 1,494,638 | 5/1924 | Sheldon | 308—206 |
| 1,757,199 | 5/1930 | Killian | 308—206 |
| 3,101,978 | 8/1963 | Stallman | 308—6C |
| 3,246,933 | 4/1966 | Better | 308—6C |
| 3,241,890 | 3/1966 | Stallman | 308—6C |
| 3,357,753 | 12/1967 | Ionov | 308—6C |
| 3,341,262 | 12/1964 | Kalmanek | 308—6C |

FOREIGN PATENTS

| | | | |
|---|---|---|---|
| 370,821 | 2/1907 | France | 308—206 |
| 1,095,309 | 6/1955 | France | 308—6 |

FRED C. MATTERN, JR., Primary Examiner

F. SUSKO, Assistant Examiner